April 5, 1966 R. K. P. GALPIN 3,245,007
CIRCUIT FOR SIDEBAND MICROWAVE GENERATOR OR RECEIVER
Filed Oct. 7, 1963 2 Sheets-Sheet 1

$(f_c+f_s)$ or $(f_c-f_s)$

April 5, 1966 R. K. P. GALPIN 3,245,007
CIRCUIT FOR SIDEBAND MICROWAVE GENERATOR OR RECEIVER
Filed Oct. 7, 1963 2 Sheets-Sheet 2

United States Patent Office 3,245,007
Patented Apr. 5, 1966

3,245,007
CIRCUIT FOR SIDEBAND MICROWAVE
GENERATOR OR RECEIVER
Robert Keith Portway Galpin, London, England, assignor to Associated Electrical Industries Limited, London, England, a company of Great Britain
Filed Oct. 7, 1963, Ser. No. 314,341
Claims priority, application Great Britain, Oct. 11, 1962, 38,557/62
4 Claims. (Cl. 332—51)

This invention relates to microwave circuit arrangements and more particularly to such an arrangement employing waveguides and suitable for use as a single sideband microwave generator or receiver.

The invention makes use of the Hall effect exhibited by a suitable conducting element, that is the effect by which, when a conducting element is carrying current and is subjected to a magnetic field transverse to the direction of the current, a voltage is produced between points on the element lying along a line transverse both to the current and to the field, the magnitude of the voltage being substantially proportional to the product of the components of the field and current at right angles to each other and to said line. An element which exhibits the Hall effect will be hereinafter referred to as a "Hall effect element."

According to the present invention a microwave circuit arrangement suitable for use as a single sideband microwave generator or receiver comprises a cavity resonator, waveguide means so coupled to said cavity resonator as in response to a microwave signal to produce a rotating microwave magnetic field in the cavity resonator, and a Hall effect element disposed in the cavity resonator for subjection to said magnetic field and having at least two pairs of electrodes lying along respective mutually crossing lines in the plane of rotation of said magnetic field.

In use of the arrangement according to the invention as a single sideband microwave generator the microwave signal is applied to said waveguide means to produce the rotating microwave magnetic field and there is applied to the electrode pairs of the Hall effect element respective differently phased versions of a modulating signal whereby to produce in the element a rotating electric current in the same plane as the rotating magnetic field, the arrangement being such that there is produced by the Hall effect element between points thereon lying along a line transverse to said plane an alternating Hall voltage which is substantially proportional to the vector product of the rotating magnetic field and the rotating electric current, that is, the product of their components which are at right angles to each other, which alternating Hall voltage contains frequency components corresponding to upper or lower sideband frequencies of the modulation product of said microwave signal and said modulating signal.

If the electric current vector rotates in the same direction as the rotating magnetic field then the alternating Hall voltage will contain frequency components corresponding to the lower sideband, whereas if it rotates in the opposite direction the alternating Hall voltage will contain frequency components corresponding to the upper sideband.

The alternating Hall voltage thus produced may be extracted from the arrangement as a single sideband signal at voltage output electrodes provided at said points on the Hall effect element. Alternatively, this alternating Hall voltage may excite resonance of the cavity resonator and be projected therefrom via further waveguide means coupled to the resonator, from which further waveguide means the voltage is subsequently extracted as the single sideband signal.

In use of the arrangement according to the invention as a single sideband microwave receiver a microwave signal is likewise applied to said waveguide means to produce the rotating microwave magnetic field. However, in this instance said further waveguide means are provided to which a second microwave signal is applied for exciting resonance thereof in the cavity resonator to produce in the latter and thus in the Hall effect element flow of axial current transversely to the plane of rotation of the magnetic field, the arrangement being such that there is produced by the Hall effect element, one at each pair of electrodes thereof, two approximately quadrature phased versions of an alternating Hall voltage containing frequency components corresponding to the sum and to the difference frequencies of the two microwave signals. By suitable phase-shifting and subsequent combining of these two versions of the alternating Hall voltages in accordance with well-known phase-shift principles, a resulting upper or lower sideband signal can be obtained.

The theory of a single sideband generation and reception using the phase-shift method as applied to a Hall effect element is considered in detail in our copending application Serial No. 44,605/60, filed in the United Kingdom on December 19, 1960 and now Patent No. 941,619.

In order that the invention may be more fully understood reference will now be made by way of example to the accompanying drawings, in which very schematically:

Figure 6:
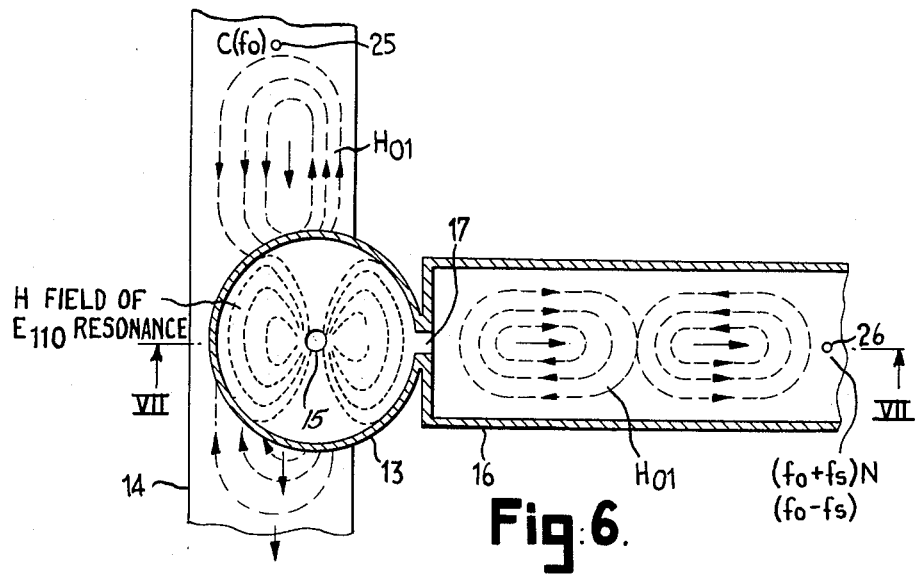
Figure 7:
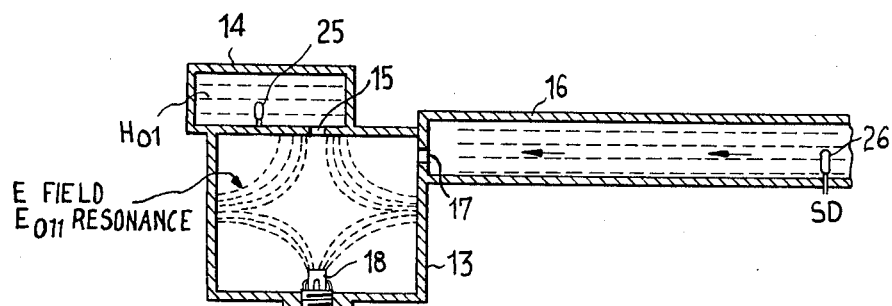
Figure 8:
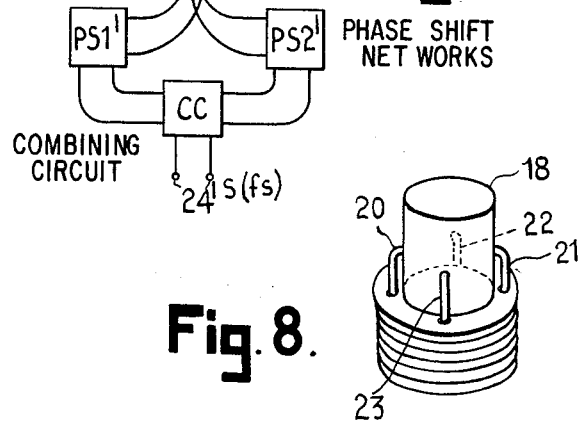

These FIGS. 1 to 5 together represent one form of microwave circuit arrangement conforming to the invention while:

FIGS. 6 to 8 illustrate an alternative form of arrangement, FIG. 7 being a section on the line VII—VII of FIG. 6.

Figure 1:
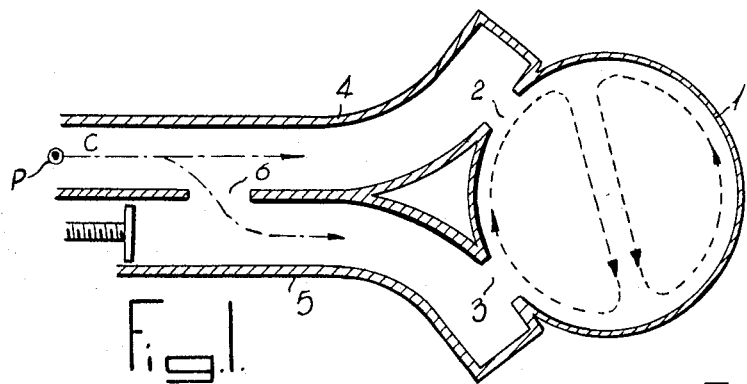
FIG. 1 illustrates a waveguide section terminating in a resonant cavity.

Consider firstly the microwave circuit arrangement represented in FIGS. 1 to 5, the waveguide section illustrated in FIG. 1 comprises a resonant cavity 1 having two coupling holes 2, 3, spaced 90° apart round the wall of the cavity and coupling the cavity with two waveguides 4 and 5. The waveguides 4, 5 are themselves coupled together by means of a further coupling hole 6. Thus the application of a microwave carrier signal C of frequency $f_0$ to the waveguide 4, as by means of a suitable probe P, will result in this signal being applied in quadrature phases to the cavity resonator 1 to set up the magnetic field pattern indicated in dotted lines, rotating at the resonant frequency.

Figures 2, 3:
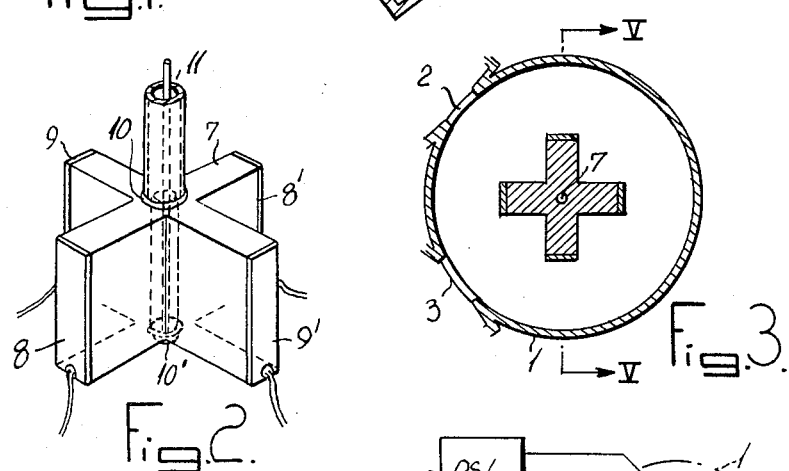
FIG. 2 illustrates a Hall effect element suitable for the invention.
FIG. 3 illustrates the positioning of the Hall effect element of FIG. 2 within the resonant cavity of FIG. 1.

A Hall effect element 7 illustrated in FIG. 2 is of cruciform shape and has two pairs of input electrodes 8, 8' and 9, 9' attached to the ends of its diagonally opposite pairs of limbs and a pair of output electrodes 10, 10' attached at its centre to opposite surfaces which lie normal to the input electrodes. The output electrode 10 is in the form of a ring surrounding an aperture extending through the centre of the element 7 and an output conductor for the element is a coaxial lead 11 having its inner conductor threaded through the aperture and connected to the output electrode 10' and its outer, screening, conductor connected to the ring electrode 10.

Figure 4:
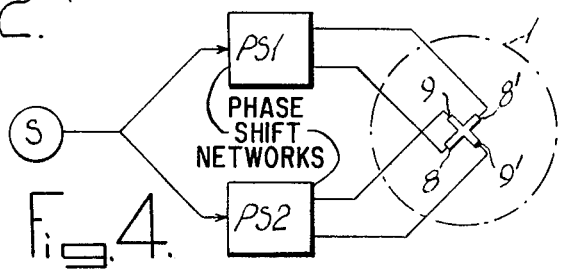
FIG. 4 illustrates a method of applying different phases of an alternating current signal to the Hall effect element.

FIG. 3 illustrates the location of the Hall effect element 7 within the cavity resonator 1 where it will be subjected to the rotating magnetic field produced by the microwave carrier signal C. FIG. 4 schematically illustrates a method of producing quadrature phases of a modulating signal S of frequency $f_s$ by applying to it two phase-shift networks PS1 and PS2, these quadrature phases being applied to the input electrodes 8, 8' and 9, 9' of the element 7 so as to produce a rotating electric current therein.

Figure 5:
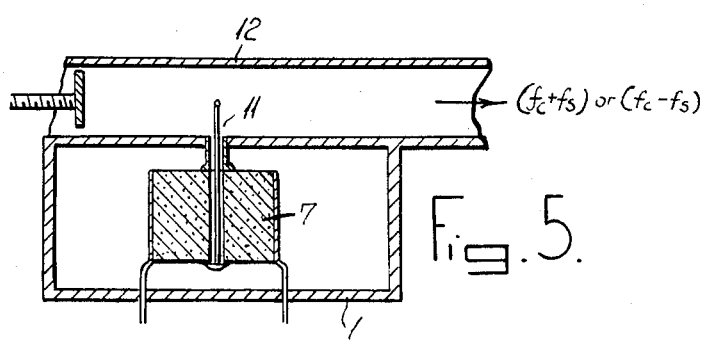
FIG. 5 illustrates the output side of the cavity resonator, being a section taken on the line V—V in FIG. 3.

In FIG. 5, which shows a side section of the cavity resonator 1 with the Hall effect element 7 located therein, the coaxial output lead 11 projects as a probe into an output waveguide 12 so that the Hall output voltage produced by the element 7 is launched into this waveguide 12 for utilization. As indicated, and as explained earlier, this Hall output voltage corresponds either to the upper sideband $(f_c+f_s)$ or to the lower sideband $(f_c-f_s)$ of the modulation product of the microwave carrier signal C and the modulating signal S.

Whereas the arrangement according to the invention just described with reference to FIGS. 1 to 5 is suitable only as a single sideband microwave generator, the arrangement next to be considered with reference to FIGS. 6 to 8 may be employed for either single sideband microwave generation or reception.

Referring to FIGS. 6 to 8, in the microwave circuit arrangement there shown, a cylindrical cavity resonator 13 is mounted on the broad face of a rectangular waveguide 14 and is coupled thereto by means of a coupling hole 15 which lies on the axis of the cavity 13 but is displaced from the centre line of the waveguide 14. Another rectangular waveguide 16 is coupled to the side of the cavity resonator 13 by means of a further coupling hole 17 at the end face of the waveguide 16. There is disposed in the cavity resonator 13 a Hall effect element 18 of cylindrical form which is mounted axially of the cavity on an adjustable screw 19 screwed into the base of the cavity resonator 13. As seen more clearly in FIG. 8, the Hall effect element 18 has two pairs of electrodes 20, 21 and 22, 23 which are located at diametrically opposed positions on the peripheral surface of the element 18. These two electrode pairs 20, 21 and 22, 23 are connected to respective phase shift networks PS1' and PS2', which latter are connected jointly to a combining circuit CC having input/output terminals 24.

When the arrangement operates as a single sideband microwave generator a microwave carrier signal C of frequency $f_o$ is applied to a probe 25 projecting into the waveguide 14 to launch into the latter an $H_{01}$ wave. Due to the displacement of the coupling hole 15 from the centre line of the waveguide 14 the magnetic field component of the $H_{01}$ wave appearing at this coupling hole is circularly polarised and this magnetic field component excites an $E_{110}$ resonance wave in the cavity resonator 13, the resonant frequency being determined by the diameter of the cavity. The magnetic field pattern H (FIG. 6) resulting from this $E_{110}$ wave is indicated in FIG. 6 and exists uniformly down the length of the cavity resonator 13 so that the Hall element 18 is subjected to a rotating magnetic field. A modulating signal of frequency $f_s$ is applied at the input terminals 24 and via the combining circuit CC to the phase shift networks PS1', PS2' so that two phase displaced versions of this modulating signal are applied respectively to the two electrode pairs 20, 21 and 22, 23 of the Hall element 18 to produce in the latter a current vector rotating in a plane perpendicular to the axis of the cavity resonator 13. By virtue of the Hall effect there is produced by the Hall element 18 as a consequence of the rotating magnetic field to which it is being subjected and this rotating current vector, an alternating Hall voltage which has frequency components corresponding either to the sum frequency (upper sideband) or to the difference frequency (lower sideband) of the microwave carrier signal C and the modulating signal S (i.e. $f_o+f_s$ or $f_o-f_s$) and which excites in the cavity resonator 13 an $E_{011}$ resonance wave (FIG. 7). The particular frequency components which are present, namely $(f_o+f_s)$ or $(f_o-f_s)$ depend upon the connection of the phase shift networks PS1' and PS2' with regard to the sense of rotation of the $E_{110}$ resonance wave. As the diameter of the cavity resonator 13 is determined by the frequency $f_o$, the $E_{011}$ resonance wave can be tuned by effectively altering the length of the cavity resonator 13, as by means of the adjustable screw 19 on which the Hall element 18 is mounted. The alternating Hall voltage thus produced by the Hall element 18 is coupled from the $E_{011}$ resonance wave by means of the coupling hole 17 into the waveguide 16 wherein it excites an $H_{01}$ mode (FIG. 6) from which the required sideband signal (upper or lower) can be extracted as by means of a probe 26.

When the arrangement operates as a single sideband microwave receiver the microwave carrier signal S of frequency $(f_o)$ is applied, as before, to the probe 25 to produce the circularly polarised field pattern H in the cavity resonator 13. However, in this instance, a received microwave signal $S_D$ is applied to the waveguide 16 to excite the $H_{01}$ wave therein (FIG. 7) and by virtue of the coupling hole 17 excites the $E_{011}$ resonance wave in the cavity resonator 13, thereby causing an axial current to flow in the Hall element 18. In this instance, by virtue of the Hall effect, the Hall effect element 18 produces at its two electrode pairs 20, 21 and 22, 23 quadrature versions of an alternating Hall voltage containing components of frequencies equal both to the sum and to the difference of the frequencies of the two microwave signals C and $S_D$. The sum frequency signal components can be ignored or suppressed and the difference frequency components are phase shifted by means of the phase shift networks PS1' and PS2' and then additively or subtractively combined as required in the combining circuit CC to produce at the terminals 24 a resultant low frequency signal in response to a received microwave signal appearing in either the upper sideband or the lower sideband position.

It is envisaged that a microwave circuit arrangement conforming to the invention may be usefully employed for modulation and/or demodulation purposes in television, radar or other circuits involving microwave frequencies.

As regards the dimensioning of the waveguide elements of the arrangement and the relationships and positions of the coupling holes, these can all be readily determined by reference to known literature on waveguides: e.g. "Microwave Engineering" by A. F. Harvey, Academic Press, 1963.

What I claim is:

1. A microwave circuit arrangement comprising a cavity resonator, waveguide means for receiving a microwave signal, coupling means coupling said waveguide means with said cavity resonator for producing therein in response to said signal a rotating microwave magnetic field in $E_{110}$ mode, a Hall effect element disposed in the cavity resonator and having two pairs of spaced apart electrodes situated on respective mutually crossing lines in the plane of rotation of said magnetic field and having also two further spaced electrodes situated along a line transverse to said plane, and means connected to said pairs of electrodes for applying thereto respective differently phased versions of a modulating current signal for producing between said further spaced electrodes an alternating Hall voltage containing frequency components corresponding to sideband frequencies of the modulation product of said microwave signal and said modulating current signal.

2. A microwave circuit arrangement as claimed in claim 1 wherein said further spaced electrodes include output connection means for connection to a screened output conductor for extraction of said alternating Hall voltage as a single sideband signal.

3. A microwave circuit arrangement as claimed in claim 1 wherein the cavity resonator is dimensioned for excitation into resonance by said alternating Hall voltage, and further waveguide means are provided coupled to said cavity resonator for extracting therefrom said alternating Hall voltage as a single sideband signal.

4. A microwave circuit arrangement comprising a cavity resonator, waveguide means for receiving a first microwave signal, coupling means coupling said waveguide means to said cavity resonator for producing therein in response to said first signal a rotating microwave magnetic field in $E_{110}$ mode, a Hall effect element disposed in the cavity resonator and having two pairs of spaced apart electrodes situated on respective mutually crossing lines in the plane of rotation of said magnetic field, further waveguide means for receiving a second microwave signal, coupling means coupling said further waveguide means to said cavity resonator for producing therein in response to said second signal flow of axial current transverse to the plane of rotation of said magnetic field for producing in the Hall effect element at respective electrode pairs two approximately quadrature phased versions of an alternating Hall voltage containing frequency components corresponding to the sum and to the difference of said first and second microwave signals, and means connected between said pairs of electrodes and output terminals for phase shifting and subsequently combining the two versions of the difference frequency component of said alternating Hall voltage for producing a resultant output signal at said output terminals.

References Cited by the Examiner
UNITED STATES PATENTS

| | | |
|---|---|---|
| 2,743,322 | 4/1956 | Pierce et al. |
| 2,794,864 | 6/1957 | Shockley _____ 330—6 |
| 2,972,104 | 2/1961 | Ward. |
| 3,003,125 | 10/1961 | Bomke et al. _____ 332—51 |

ROY LAKE, *Primary Examiner.*

ALFRED L. BRODY, *Examiner.*